(12) United States Patent
Buelow et al.

(10) Patent No.: US 6,528,134 B1
(45) Date of Patent: Mar. 4, 2003

(54) NON-WAX PACKAGING FILM

(75) Inventors: Duane H. Buelow, Neenah, WI (US);
Jay D. Hodson, Greenville, WI (US);
Chad Perre, Oshkosh, WI (US);
Richard Littmann, Neenah, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 09/598,733

(22) Filed: Jun. 21, 2000

(51) Int. Cl.$^7$ .................. B32B 27/18; B32B 27/22; B32B 27/32
(52) U.S. Cl. ................. 428/35.7; 426/127; 426/130; 426/415; 428/349; 428/516; 428/520; 428/903.3
(58) Field of Search ................. 428/35.2, 349, 428/516, 520, 903.3, 35.7; 426/127, 130, 415

(56) References Cited

U.S. PATENT DOCUMENTS

| | | | |
|---|---|---|---|
| 4,275,120 A | 6/1981 | Weiner | 428/516 |
| 4,291,092 A | 9/1981 | Weiner | 428/349 |
| 4,339,498 A | 7/1982 | Weiner | 428/349 |
| 4,407,874 A | 10/1983 | Gehrke | 428/35 |
| 4,421,823 A | 12/1983 | Theisen et al. | 428/349 |
| 4,424,256 A | 1/1984 | Christensen et al. | 428/347 |
| 4,704,314 A | 11/1987 | Hsu et al. | 428/35 |
| 4,784,863 A | 11/1988 | Lustig et al. | 426/113 |
| 4,786,533 A | 11/1988 | Crass et al. | 428/13 |
| 4,898,771 A * | 2/1990 | Havens | 428/316 |
| 4,956,232 A | 9/1990 | Balloni et al. | 428/349 |
| 5,106,562 A | 4/1992 | Blemberg et al. | 264/171 |
| 5,108,844 A | 4/1992 | Blemberg et al. | 428/518 |
| 5,137,955 A | 8/1992 | Tsuchiya et al. | 524/310 |
| 5,190,711 A | 3/1993 | Blemberg | 264/171 |
| 5,212,009 A | 5/1993 | Peiffer et al. | 428/220 |
| 5,236,642 A | 8/1993 | Blemberg et al. | 264/40.7 |
| 5,292,563 A | 3/1994 | Peiffer et al. | 428/35.9 |
| 5,419,934 A | 5/1995 | Wilson | 428/34.9 |
| 5,429,862 A | 7/1995 | Schuhmann et al. | 428/215 |
| 5,451,455 A | 9/1995 | Peiffer et al. | 428/323 |
| 5,474,820 A | 12/1995 | Murschall et al. | 428/35.7 |
| 5,554,245 A | 9/1996 | Schuhmann et al. | 156/244.24 |
| 5,560,948 A | 10/1996 | Peiffer et al. | 428/127 |
| 5,667,902 A | 9/1997 | Brew et al. | 428/518 |
| 5,756,169 A | 5/1998 | Peiffer et al. | 428/34.9 |
| 5,773,142 A | 6/1998 | Murschall et al. | 428/349 |
| 5,811,165 A | 9/1998 | Andreen | 428/52 |
| 5,817,412 A | 10/1998 | Lohmann et al. | 428/336 |
| 5,851,640 A | 12/1998 | Schuhmann et al. | 428/200 |
| 5,932,157 A | 8/1999 | Dries et al. | 264/176.1 |
| 5,945,225 A | 8/1999 | Speith-Herfurth et al. | 428/516 |
| 5,972,496 A | 10/1999 | Bader et al. | 428/331 |
| 5,997,968 A | 12/1999 | Dries et al. | 428/35.7 |

FOREIGN PATENT DOCUMENTS

JP          09239926 A   *   9/1997   ............ B29C/55/12

* cited by examiner

*Primary Examiner*—Sandra M. Nolan
(74) *Attorney, Agent, or Firm*—McDermott, Will & Emery

(57) ABSTRACT

Non-wax film structures having three layers wherein the first skin layer comprises a polymer or blend of polymers and a hydrogenated aliphatic hydrocarbon additive; a second core layer comprises a polymer or a blend of polymers, a hydrogenated aliphatic hydrocarbon additive and regrind material; and a third sealant layer comprises a polymer or blend of polymers and a cheese release agent are disclosed. The film structures are useful in the packaging of food products, especially cheese.

13 Claims, 2 Drawing Sheets

NON-WAX PACKAGING FILM

FIELD OF THE INVENTION

The invention relates to non-wax film structures useful in the packaging of food products, especially cheese. More specifically, the invention relates to polymeric film structures containing a hydrogenated aliphatic hydrocarbon additive useful in the packaging of food products, especially cheese.

BACKGROUND OF THE INVENTION

Wax packaging has been used over the years for food packaging, especially the packaging of cheese and processed cheese. For example, cheese manufacturers have utilized wax-coated cellophane to package 1-, 2-, 3- and 5-pound processed cheese loaves. In addition, machinery has been developed to form wax-coated cellophane film structures for pouches that are then inserted into corrugated boxes and filled with cheese at high temperatures.

Several issues have developed regarding the use of a typical wax-coated cellophane film structure for packaging food products such as cheese. First, wax coatings require a starch dusting (potato or corn powder depending on the final cheese product) to prevent "blocking" (i.e., fusing or sticking together) of the final structure in roll form. This is due to the soft nature of the wax. In addition, the starch aids in "cheese release" enabling the consumer to completely remove the wax coated cellophane structure from the cheese before consumption. These starch coatings tend to rub off of the film during machining causing an undesirable starch buildup on equipment. Secondly, due to the soft nature of wax coatings, they are temperature sensitive and require special storage conditions. Abnormally high temperature storage can cause complete blocking of finished rolls as the wax coating can activate during storage. In addition, at abnormally cold temperatures wax coatings can become brittle causing wax splitting and delaminating of the wax coating off of the cellophane substrate. Thirdly, as new processed cheese products have been developed, higher filling temperatures are being used by cheese manufacturers, and the need for a less heat sensitive sealant is desirable to aid in "cheese release." It has now become desirable to find a replacement for cellophane and wax coatings.

Therefore there is a need to find a non-wax sealant film structure that would overcome the disadvantages of the wax-coated cellophane film structures of the prior art and yet meet the processing and packaging requirements of the food product, especially a cheese product.

Polymeric, sealant films are known in the art. Schuhmann, et al., U.S. Pat. No. 5,429,862 disclose a sealable film comprising a base layer comprising polypropylene and a hydrocarbon resin and at least one top layer comprising (ii) at least one top layer comprising (a) an ethylene/propylene copolymer having an ethylene content of not more than about 10% by weight, (b) a propylene/1-butene copolymer, (c) a propylene/ethylene/alpha-olefin terpolymer, or (d) a blend of two or more of (a), (b) and (c), wherein at least one of said base layer and said at least one top layer contains an anti-blocking agent or lubricant.

Schuhmann, et al., U.S. Pat. No. 5,851,640 disclose a multilayer film structure having a core layer and a sealable top layer and an intermediate layer between said core and sealable layer. The core layer comprises a propylene polymer; the sealable top layer comprises:

a copolymer of ethylene and propylene, ethylene and butylene, propylene and butylene, ethylene and an alpha-olefin having 5 to 10 carbon atoms, or propylene and an alpha-olefin having 5 to 10 carbon atoms, or a terpolymer of ethylene and propylene and butylene, or ethylene and propylene and an alpha-olefin having 5 to 10 carbon atoms, or a mixture of one or more of the above copolymers and terpolymers with polypropylene, or a mixture of two or more of said copolymers, said terpolymers, or both of said copolymers and said terpolymers, and the intermediate layer consists essentially of a propylene polymer.

Weiner, U.S. Pat. No. 4,275,120 discloses a multiple layer, heat-sealable film having a substrate layer consisting of a homopolymer of poly(propylene) or a copolymer of propylene and a blend compatible polyolefins and at least one heat sealable layer consisting of a blend poly(1-butene), and a copolymer of ethylene or propylene and a higher olefin.

Weiner, U.S. Pat. No. 4,291,092 discloses a multi-layer heat sealable film having a substrate layer consisting of a homopolymer of poly(propylene) or a copolymer of propylene and a blend compatible polyolefins and at least one heat sealable layer consisting of a blend of a copolymer of ethylene and a higher olefin and a copolymer of propylene and a higher olefin.

Weiner, U.S. Pat. No. 4,339,498 discloses a film comprising a core or substrate layer of propylene and a heat sealable surface layer which is present on either one or both sides of the substrate is:

(1) an interpolymer of 1–90 mole percent of propylene, 1–98 mole percent of an alpha-olefin having four or more carbon atoms and 1–98 mole percent of a different alpha-olefin having four or more carbon atoms;

(2) a copolymer of 50–97 mole percent of butene-1 and 3–50 mole percent of an alpha-olefin having more than four carbon atoms; or (3) an interpolymer of 2–94 mole percent of ethylene, 1–93 mole percent of propylene, and 5–97 mole percent of an alpha olefin having four or more carbon atoms.

Schuhmann, et al., U.S. Pat. No. 5,554,245 disclose a process for producing a sealable film comprising:

(A) producing by coextrusion through a slot die a cast film comprising:
 (i) a base layer comprising polypropylene and a hydrocarbon resin having a softening point of at least 140° C., and
 (ii) at least one top layer comprising
  (a) an ethylene/propylene copolymer having an ethylene content of not more than about 10% by weight,
  (b) a propylene/1-butene copolymer,
  (c) a propylene/ethylene/alpha-olefin terpolymer, or
  (d) a blend of two or more of (a), (b) and (c), wherein said top layer comprises an antiblocking agent with an average particle size of 1 to 6 μm, (B) chilling the cast film on a chill roll; and then (C) orienting the film by biaxial stretching in the longitudinal and transverse directions.

Wilson, U.S. Pat. No. 5,419,934 discloses a three layered film, the three layers having two outer layers and an intermediate layer. The intermediate layer comprises a mixture of a first linear low density poly(ethylene) and a polyolefin wherein poly(propylene) is exemplified; and at least one of the two outer layers comprises a second linear low density poly(ethylene).

It is also known in the art that polymer sealant film structures provide a more consistent cheese release because a polymer film sealant has a higher melting point. Wax typically melts at the same temperature that processed cheese is filled at ~165° F. whereas, a polymer sealant melts at a significantly higher temperature. In addition, the higher melting point of a polymer sealant eliminates the need for starch, which is required for a wax coating, eliminating starch build up issues. A typical coextruded film, however, lacks the stiffness, "dead-fold", pouch formation, and cutting qualities of a typical wax-coated cellophane structure. Due to the "memory" effect of polymers, it is difficult to maintain pouch formation during the filling of product. In addition, a coextruded film is more sensitive to the "shear" cutting employed on a typical processed cheese line during pouch formation. In summary, a typical wax structure cuts more consistently, is stiffer, has higher "dead-fold", and tends to maintain pouch formation shape (less memory), all of which facilitates easier product filling.

Therefore, given the advantages and disadvantages of both the wax-cellophane film structure and the polymeric sealant film structures, there is a need to develop a polymeric sealant film structure which has the properties of high melt temperature, stiffness, dead-fold, pouch formation and cutting qualities.

An objective of this invention is to provide three layer cast coextruded film structures.

A further objective of this invention is to provide three layer cast coextruded film structures which have the properties of high melt temperature, stiffness, dead-fold, pouch formation and cutting qualities.

It is a still a further objective of this invention to provide food product packages produced from cast coextruded three layer film structures having the above properties.

SUMMARY OF THE INVENTION

Figure 1:
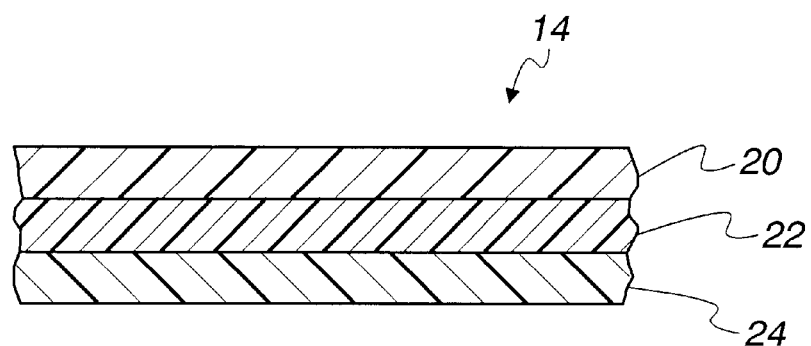
FIG. 1 depicts a three layer film structure of the present invention.

The present invention provides cast coextruded polymeric film structures comprising three layers wherein said layers comprise a first skin layer, a second core layer and a third sealant layer, and wherein said first skinlayer comprises a polymer or a blend of polymers and a hydrogenated aliphatic hydrocarbon, said second core layer comprises a polymer or a blend of polymers, a hydrogenated aliphatic hydrocarbon and regrind material; and said third sealant layer comprises a polymer or a blend of polymers and a cheese release agent and may optionally contain an adhesive. The core layer comprises virgin material and regrind material from the total film structure. In the core layer the virgin material comprises from about 70% to about 95% and the regrind material comprises from about 5% to about 30% of the total core layer.

The present invention also provides for structures wherein said structures are pouches that are converted from the cast coextruded film structures of the present invention. Pouches that are made from the film structures of the present invention are capable of standing in an upright position during hot-filling of the food product. The pouches of the invention may also be placed in a corrugated box during the filling process.

In one embodiment of the present invention, the invention comprises multilayer structures comprising three layer cast coextruded film structures. The multilayer film structures comprises a first skin layer; a second core layer and a third sealant layer. The multilayer film structures further comprise a hydrogenated aliphatic hydrocarbon, a cheese release agent and an optional adhesive. The total film structure has a thickness from about 2 mls to about 4 mls, preferably about 3 mls.

The first skin layer comprises a polymer or a blend of polymers wherein the preferred polymer is poly(propylene) or a blend of different poly(propylenes). A preferred poly (propylene) is Exxon-Mobil PP4893.

The polymer or blend of polymers of the first skin layer comprises from about 80% to about 95%, preferably about 90% of the skin layer. The first skin layer also comprises a hydrogenated aliphatic hydrocarbon. Preferred hydrogenated aliphatic hydrocarbon resins that are useful in the practice of this invention are exemplified by Hercules 2539 and Hercules 2557 from Hercules Incorporated, Wilmington, Del. The hydrogenated aliphatic hydrocarbon comprises from about 5% to about 20%, preferably about 10% of the first skin layer. The first skin layer may have a thickness of between about 5% to about 30% of the total film structure, preferably about 15% of the total film structure.

The second core layer comprises virgin material and regrind material. The virgin material comprises a polymer or a blend of polymers wherein the polymer is poly(propylene) or a blend of different poly(propylenes) and a hydrogenated aliphatic hydrocarbon. The virgin material of the second core layer comprises from about 70% to about 95% of the core layer. The polymer or blend of polymers of the core layer virgin material comprises from about 80% to about 95%, preferably about 90%. The hydrogenated aliphatic hydrocarbon of the virgin material of the second core layer comprises from about 5% to about 20%, preferably about 10%. A preferred poly(propylene) is Exxon-Mobil PP4893. A preferred hydrogenated aliphatic hydrocarbon is Hercules 2539 or Hercules 2557 from Hercules Incorporated, Wilmington, Del. The regrind material, which comes from the total film structure, comprises from about 5% to about 30% of the core layer. The second layer has a thickness of from about 50% to about 75%, preferably about 65% of the total film structure.

The third sealant layer comprises a polymer or a blend of polymers wherein the polymer is selected from poly (ethylenes), poly(ethylenes) copolymers and poly(butylene). A preferred poly(ethylene)is low density poly(ethylene). A preferred low density poly(ethylene) is Exxon-Mobil 135.09. A preferred poly(butylene) is Montell 8340. The polymer or blend of polymers of the third sealant layer comprises about 55% of the sealant layer. The ratio of the polymers is about 40% poly(ethylene) to about 15% poly (butylene) in the presence of an adhesive. In the absence of an adhesive, the percentage of the blend of polymers is about 75%. The ratio of the polymers is then about 60% poly (ethylene) to about 15% poly(butylene). The third sealant layer further comprises a cheese release agent. A preferred cheese release agent is GMS. A preferred GMS is Ampacet 10069 from Ampacet Corporation. The third sealant layer may optionally contain an adhesive. A preferred adhesive is poly(ethylene) ethyl methyl acrylate copolymer which is Exxon-Mobil TC120 from Exxon-Mobil. The third layer has a thickness from 10% to 30%, preferably 20% of the total film.

Figure 2:
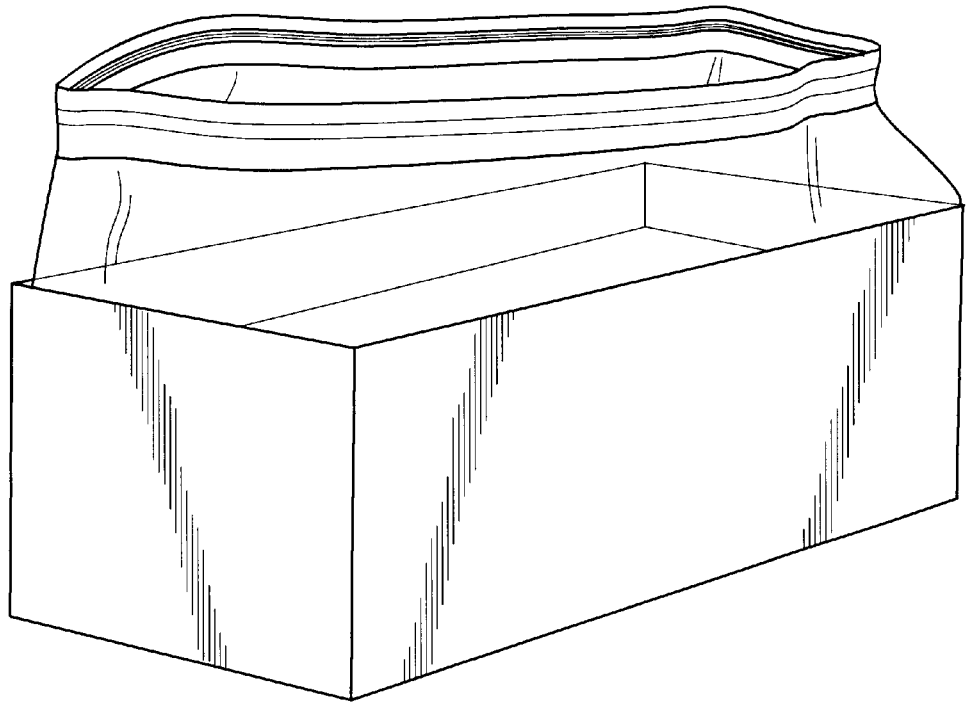
FIG. 2 depicts a pouch that is made from the three layer film structure of the present invention in a corrugated box.

In another preferred embodiment of the present invention, the multilayer structure is converted into a pouch which is depicted in FIG. 2. The pouch is capable of standing in an upright position during hot-filling of a food product, especially cheese.

The film structures of the present invention have the following properties: stiffness which allows the pouch which has been converted from the film to remain rigid during the hot-fill process; dead fold which allows the pouch which has been converted from the film to retain its shape and remain open during the hot-fill process; and cutting qualities which allows the film to cut clearly without deformation of said film.

The film structures of the present invention are produced by cast film coextrusion processes which are well known in the art.

Definition of Term

GMS shall mean glycerol mono-stearate.

DETAILED DESCRIPTION OF THE DRAWINGS

FIG. 1 shows a preferred multilayer film (14) which comprises three layers: a skin layer (20), a core layer (22) and a sealant layer (24). The skin layer (20) comprises poly(propylene) and a hydrogenated aliphatic hydrocarbon. A particularly preferably poly(propylene) is Exxon-Mobil PP4893. A particularly preferred hydrogenated aliphatic hydrocarbon is Hercules 2539 from Hercules Incorporated, Wilmington, Del. The core layer (22) comprises poly (propylene) and a hydrogenated aliphatic hydrocarbon. A particularly preferred poly(propylene) is Exxon-Mobil PP4893. A particularly preferred hydrogenated aliphatic hydrocarbon is Hercules 2539 from Hercules Incorporated, Wilmington Del. The core layer also comprises regrind material. The sealant layer (24) comprises low density poly(ethylene), poly(butylene), an adhesive and a cheese release agent. A particularly preferred low density poly (ethylene) is Exxon-Mobil 135.09. A particularly preferred poly(butylene) is Montell 8340. A particularly preferred cheese release agent is Ampacet 10069 from Ampacet Corporation. A particularly preferred adhesive is Exxon-Mobil TC120.

FIG. 2 shows a pouch in an upright position in a corrugated box made from the film structure of FIG. 1. Conveniently, the pouch of FIG. 2 may have a closure such as a zipper or tape that may be easily openable and reclosable by the consumer.

The following non-limiting examples are given by way of illustration and are not intended to be considered a limitation on the invention.

EXAMPLE 1

By using a cast film coextrusion process, a three layer film structure was produced comprising a first skin layer of poly(propylene) and a hydrogenated aliphatic hydrocarbon additive; a second core layer of poly(propylene), and a hydrogenated aliphatic hydrocarbon additive and regrind material; and a third sealant layer of low density poly (ethylene), poly(butylene), adhesive and a cheese release agent. The film structure of Example 1 has the following specification:

|  | Resin | Density (G/CC) | % of Layer | % of WEB | Layer Density (G/CC) | Component Weight (LB/REAM) | Layer Weight (LB/Ream) | Component Wt. % of WEB | Layer Wt. % of Web | Layer Caliper (MIL) |
|---|---|---|---|---|---|---|---|---|---|---|
| Layer 1 | Exxon-Mobil PP 4893 | 0.906 | 90.0% | 15.0% | 0.9055 | 5.72 | 6.35 | 13.45% | 14.95% | 0.45 |
|  | Hercules 2539 | 0.901 | 10.0% |  |  | 0.64 |  | 1.49% |  |  |
| Layer 2 | Exxon-Mobil PP4893 | 0.906 | 90.0% | 65.0% | 0.9055 | 24.78 | 27.53 | 58.30% | 64.78% | 1.95 |
|  | Hercules 2539 | 0.901 | 10.0% |  |  | 2.75 |  | 6.48% |  |  |
| Layer 3 Sealant | Exxon-Mobil 135.09 | 0.920 | 40.0% | 20.0% | 0.9212 | 3.45 | 8.62 | 8.11% | 20.28% | 0.60 |
|  | Montell 8340 | 0.908 | 15.0% |  |  | 1.29 |  | 3.04% |  |  |
|  | Ampacet 10069 | 0.915 | 25.0% |  |  | 2.15 |  | 5.07% |  |  |
|  | Exxon-Mobil TC120 | 0.942 | 20.0% |  |  | 1.72 |  | 4.06% |  |  |
| Total: |  |  |  |  |  | BasisWt. = | 100.0% | 100.0 | 100.0% | 3.00 |

We claim:

1. A non-wax film structure for use in food product packages having the properties of stiffness and dead-fold wherein said film structure comprises three layers and wherein said layers comprise a first skin layer comprising a polymer or a blend of polymers comprising is poly (propylene) and a hydrogenated aliphatic hydrocarbon; a second core layer comprising a polymer or a blend of polymers comprising is poly(propylene), a hydrogenated aliphatic hydrocarbon additive, and a regrind material; and a third sealant layer comprising a polymer or a blend of polymers wherein the polymer is selected from the group consisting of poly(ethylenes), poly(ethylene) copolymers and poly(butylenes), and, in a addition, a cheese release agent wherein said cheese release agent is glycerol mono-stearate, and an optionally present adhesive, and wherein pouches made with the film can stand upright during hot filling.

2. The film structure according to claim 1 wherein the poly(propylene) comprises about 90% of the first skin layer.

3. The film structure according to claim 1 wherein the hydrogenated aliphatic hydrocarbon additive comprises about 10% of the first skin layer.

4. The film structure according to claim 1 wherein the regrind material of the second core layer comprises from about 5% to about 30% of the second core layer.

5. The film structure according to claim 1 wherein the blend of polymers for the third sealant layer are low density poly(ethylene) and poly(butylene).

6. The film structure according to claim 1 wherein the third sealant layer further comprises an adhesive.

7. The film structure according to claim 6 wherein the adhesive is ethylene methyl acrylate copolymer.

8. A pouch made from the film structure of claim 1.

9. The film structure according to claim 1 wherein the blend of polymers for the first skin layer is a blend of different poly(propylenes).

10. The film structure according to claim 1 wherein the blend of polymers for the second core layer is a blend of different poly(propylenes).

11. A non-wax film structure comprising three layers wherein said layers are a first skin layer, a second core layer, and a third sealant layer wherein said first skin layer comprises poly(propylene) and hydrogenated aliphatic hydrocarbon additive said second core layer comprises poly(propylene), hydrogenated aliphatic hydrocarbon additive, and regrind material; and wherein said third sealant layer comprises a blend of low density poly(ethylene) and, in addition, poly(butylene) and cheese release agent wherein said agent is glycerol mono-stearate, and wherein pouches made with the film can stand upright during hot filling.

12. The film structure according to claim 11 wherein the third sealant layer further comprises an adhesive.

13. The film structure according to claim 12 wherein the adhesive is ethylene methyl acrylate copolymer.

* * * * *